US007499567B2

(12) United States Patent
Shimosato

(10) Patent No.: US 7,499,567 B2
(45) Date of Patent: Mar. 3, 2009

(54) ELECTRONIC DEVICE AND INFORMATION PROCESSING APPARATUS AND CONTROL METHOD THEREOF, AND COMPUTER PROGRAM AND COMPUTER-READABLE STORAGE MEDIUM

(75) Inventor: Jiro Shimosato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/253,098

(22) Filed: Oct. 18, 2005

(65) Prior Publication Data

US 2006/0083404 A1 Apr. 20, 2006

(30) Foreign Application Priority Data

Oct. 19, 2004 (JP) .............................. 2004-304344

(51) Int. Cl.
*G06K 9/00* (2006.01)
*G06K 19/06* (2006.01)
(52) U.S. Cl. .................... 382/100; 382/321; 235/494
(58) Field of Classification Search ................. 382/100, 382/103, 107, 112, 140, 155, 168, 181, 182, 382/184, 189, 203, 232, 236, 248, 274, 287, 382/305, 312; 380/28, 37; 713/164; 375/240.03; 235/494
See application file for complete search history.

(56) References Cited

U.S. PATENT DOCUMENTS 5,724,428 A * 3/1998 Rivest .......................... 380/37
5,796,435 A * 8/1998 Nonomura et al. ..... 375/240.03
6,304,657 B1 * 10/2001 Yokota et al. ................. 380/28

7,000,107 B2 * 2/2006 Hewett et al. ................ 713/164
7,340,604 B2 * 3/2008 Hewett et al. ................ 713/164
7,367,514 B2 * 5/2008 Soule et al. .................. 235/494

FOREIGN PATENT DOCUMENTS

| CN | 1275846 A | 12/2000 |
|---|---|---|
| EP | 0750116 A1 | 12/1996 |
| EP | 1 056 240 A1 | 11/2000 |
| JP | 09-004591 A | 1/1997 |
| JP | 2003-85474 A | 3/2003 |
| JP | 2003-256762 A | 9/2003 |
| JP | 2005-210267 A | 8/2005 |
| JP | 2006-001063 A | 1/2006 |

OTHER PUBLICATIONS

Relevant Portion of Chinese Office Action issued in corresponding Chinese Patent Application No. 2005101094168, dated Apr. 20, 2007.
Office Action issued in the corresponding Japanese application No. 2004-304344 mailed on Jun. 18, 2007.

* cited by examiner

*Primary Examiner*—Seyed Azarian
(74) *Attorney, Agent, or Firm*—Rossi, Kimms & McDowell, LLP

(57) ABSTRACT

Parameters to be set in an electronic device are generated with a simple operation, and further, safely in terms of security. For this purpose, upon generation of setting parameters for an electronic device having a radio LAN function and an image sensing function, first, parameters necessary for radio LAN communication are inputted. Then, a secret key for encryption of the input parameters is inputted. Thereafter, the input parameters are encrypted with the secret key, thus encrypted information is generated. A two-dimensional barcode image is generated from the encrypted information, and the image is visibly outputted to be subjected to image sensing utilizing the image sensing function.

6 Claims, 8 Drawing Sheets

FIG. 4

| | | |
|---|---|---|
| ESS-ID | test | |
| WEP KEY | × × × × × × | |
| Channel | 1ch | ▽ |
| Config | AD-HOC | ▽ |

CANCEL　　NEXT ▶

ELECTRONIC DEVICE AND INFORMATION PROCESSING APPARATUS AND CONTROL METHOD THEREOF, AND COMPUTER PROGRAM AND COMPUTER-READABLE STORAGE MEDIUM

FIELD OF THE INVENTION

The present invention relates to an optical information reading apparatus having a function of optically reading an information code such as a barcode or a two-dimensional code and an output apparatus for outputting the information code.

BACKGROUND OF THE INVENTION

In recent years, mobile terminals such as cellular phones and digital cameras have highly-advanced functions, and an increasing number of these terminals are connectable with a network. However, as operation members of these mobile terminals are limited, it is very troublesome to input parameters such as an ID and a password for access to the network. Further, as a certain degree of knowledge of network is required for setting these parameters, users poor in network knowledge have difficulty in setting itself.

Accordingly, as a method for setting the parameters without user's input, an information code reading function may be added to a mobile terminal. A user can perform setting by reading the parameters using the information code reading function of the mobile terminal, from a display device where the parameters converted to information codes are outputted.

As a method for setting system parameters for an optical information reading apparatus, a technique of automatically setting parameters by reading a two-dimensional barcode (QR code) converted from the parameters as a type of information code is known (for example, Japanese Patent application Laid-Open No. 2003-85474).

However, when a secret parameter such as a password for connection with a network is set in a reading apparatus by the above-described method, the secret parameter can be held and set using any terminal merely by reading the code as long as the terminal has information-code reading function. This has a problem in terms of security.

SUMMARY OF THE INVENTION

The present invention has been made in consideration of the above problems, and provides a technique for generating a parameter to be set in an electronic device, with a simple operation, and further, safely in terms of security.

To attain the object, the present invention provides an information processing apparatus for generating a parameter for an electronic device having predetermined image sensing means and processing means for performing processing in accordance with the parameter, comprising:

input means for inputting the parameter for the electronic device;

encryption means for encrypting the parameter inputted by the input means thereby generating encrypted information; and image output means for generating a visible image to be subjected to image sensing by the image sensing means of the electronic device based on the encrypted information obtained by the encryption means, and outputting the visible image.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates a display window displayed on the personal computer according to the embodiment;

DETAILED DESCRIPTION OF THE PREFERRED EMBODIMENT

Hereinbelow, a preferred embodiment of the present invention will now be described in detail in accordance with the accompanying drawings.

Note that in the embodiment, the invention is applied to a personal computer (PC) as a setting-information input/output apparatus and a digital camera which optically reads an information code as a subject device of setting.

<Configuration of Digital Camera>

Figure 1:
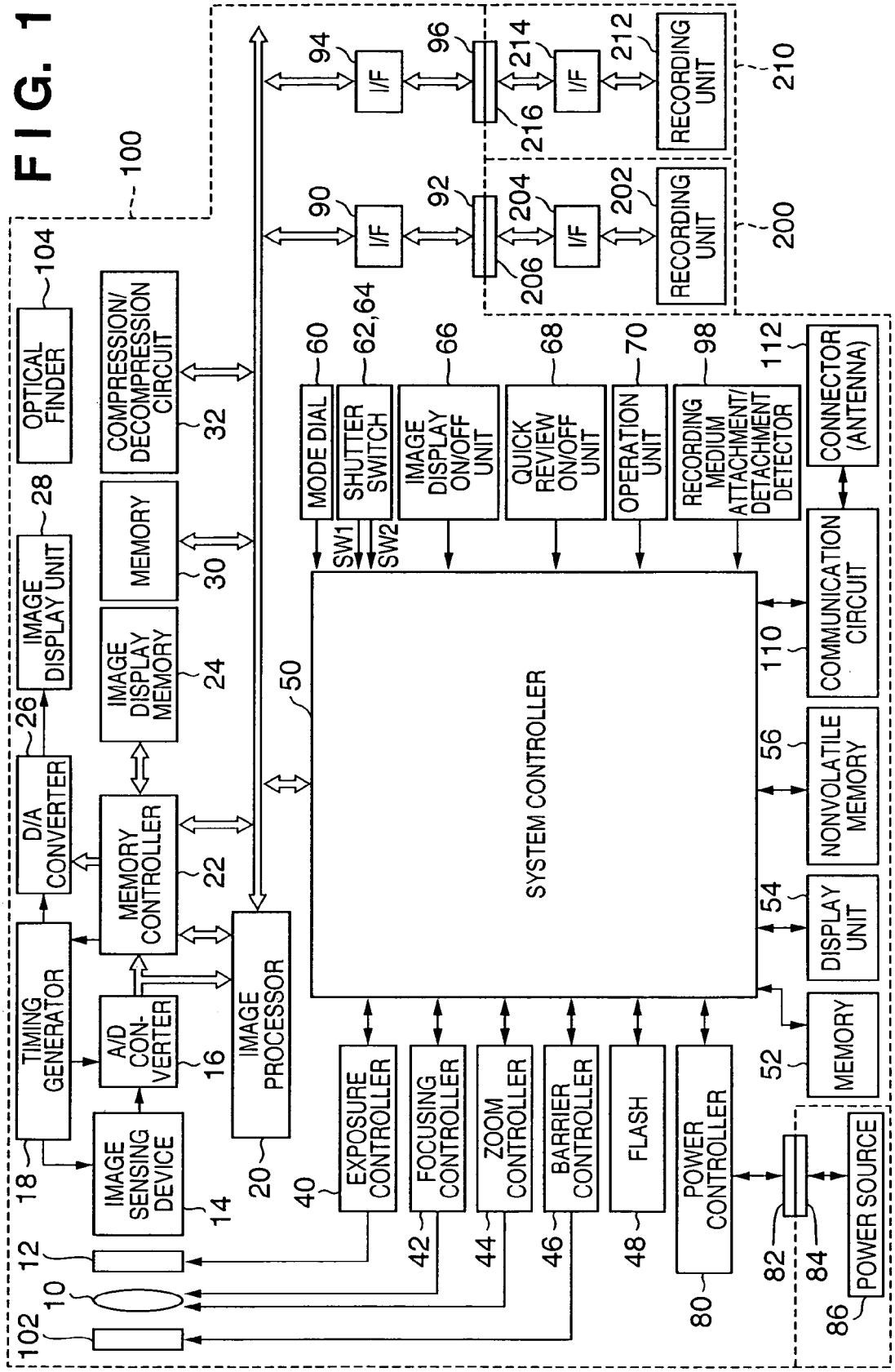
FIG. 1 is a block diagram of a digital camera according to an embodiment of the present invention.

FIG. 1 is a block diagram of a digital camera according to the embodiment. A digital camera 100. performs image sensing on a subject via an optical system (image sensing lens) 10. The optical system 10 having a zoom lens (capable of varying image-sensing view angle) provides an optical zooming function (so-called optical zooming). The digital camera 100 further has an electronic zooming function (so-called electronic zooming) by electrically cutting (trimming) an image obtained by an image sensing device 14. Note that it may be arranged such that the digital camera 100 has one of the optical zooming function and the electronic zooming function. Further, the optical system 10 may be an exchangeable system. In this case, the zooming function may be provided by sending an electric signal from the main body side of the digital camera 100 to the optical system 10 so as to drive the zoom lens with a driving mechanism of the optical system. Otherwise, the main body side of the digital camera 100 may be provided with a driving mechanism to mechanically drive the zoom lens in the optical system 10.

A light beam from a subject passing through the optical system (image sensing lens) 10 (light beam incident from an optical image view angle) forms an optical image of the subject on an image sensing surface of the image sensing device (e.g., a CCD sensor or a CMOS sensor) 14 through an opening of a shutter 12 having an aperture function. The image sensing device 14 converts the optical image into an electric analog image signal and outputs the signal. An A/D converter 16 converts the analog image signal supplied from the image sensing device 14 into a digital image signal. The image sensing device 14 and the A/D converter 16 are controlled by a clock signal and a control signal supplied from a timing generator 18. The timing generator 18 is controlled by a memory controller 22 and a system controller 50.

An image processor 20 performs image processing such as pixel interpolation processing and color conversion processing on the image data supplied from the A/D converter 16 or image data 'supplied from the memory controller 22. Further, the image processor 20 performs computation to obtain data for TTL (Through The Lens) AF (Auto Focus) processing, AE (Auto Exposure) processing and EF (auto light adjustment by flash pre-illumination), based on image data obtained by the image sensing device 14, and supplies the result of computation to the system controller 50. The system controller 50 controls an exposure controller 40 and a focusing controller (AF controller) 42 based on the result of computation, thus realizes auto exposure and auto focus functions. Further, the image processor 20 also performs TTL (Through The Lens) AWB (Auto White Balance) processing based on the image data obtained by the image sensing device 14.

The memory controller 22 controls the A/D converter 16, the timing generator 18, the image processor 20, an image display memory 24, a D/A converter 26, a memory 30, and a compression/decompression circuit 32.

The image data outputted from the A/D converter 16 is written, via the image processor 20 and the memory controller 22, or via the memory controller 22 without processing by the image processor 20, into the image display memory 24 or the memory 30.

The image data for display, written in the image display memory 24, is converted by the D/A converter 26 to an analog image signal for display and supplied to an image display unit 28, thereby an image obtained by image sensing is displayed on the image display unit 28. An electronic finder function is realized by continuously displaying images on the image display unit 28. The display on the image display unit 28 is arbitrarily turned ON/OFF in accordance with a command from the system controller 50. When the image display unit 28 is used while the display is OFF, the electric consumption of the digital camera 100 can be greatly reduced.

The memory 30 is used for storing still pictures and moving images obtained by image sensing (for recording images on a recording medium). The capacity and access speed (writing speed and reading speed) of the memory 30 are arbitrarily determined. However, to realize continuous shots of continuously performing image sensing to obtain plural still pictures and to realize panoramic image sensing, it is required that the memory 30 have a capacity and an access speed corresponding to such image sensings. The memory 30 is also used as a work area for the system controller 50.

The compression/decompression circuit 32 compresses and decompresses image data by e.g. adaptive discrete cosine transformation (ADCT). The compression/decompression circuit 32 reads image data stored in the memory 30, performs compression processing or decompression processing on the data, and writes the processed image data to the memory 30.

The exposure controller 40 controls the shutter 12 having the aperture function based on information supplied from the system controller 50. The exposure controller 40 has a flash adjustment function associated with a flash (light emitting device) 48. The flash 48 has the flash adjustment function and a light projection function for projecting light as AF fill light.

The focusing controller 42 controls the focusing lens of the optical system 10 based on information supplied from the system controller 50. The zoom controller 44 controls zooming of the optical system 10. A barrier controller 46 controls the operation of a barrier 102 which protects the optical system 10.

A display unit (e.g., an LCD and an LED) 54 and a sound source (e.g., a speaker) 55, respectively having a single or plural devices, output an operation status, a message and the like by characters, images, voice and the like, in correspondence with execution of a program in the system controller 50. The display unit 54 and the sound source 55 are provided in appropriate positions of the digital camera 100. A part of display devices constructing the display unit 54 may be provided in an optical finder 104.

The information displayed on the display unit 54 includes information displayed on an LCD or the like indicating single-shot/continuous shots, a self timer, a compression ratio, the number of recording pixels, the number of recorded images, the remaining number of images obtainable by image sensing, a shutter speed, an aperture value, exposure correction, a flash, red-eye reduction, macro image sensing, buzzer setting, remaining clock battery capacity, battery capacity, an error, information by plural digits of figure, attachment/detachment of recording media 200 and 210, communication I/F operation, date and time, image sensing mode/information code reading mode and the like.

Further, the information displayed on the display unit 54 further includes information displayed in the optical finder 104 indicating focusing, a camera-shake warning, flash charging, a shutter speed, an aperture value, exposure correction and the like.

A nonvolatile memory 56 is an electrically erasable and recordable memory such as an EEPROM. Image data and object data from an external device may be stored in the nonvolatile memory 56.

A first shutter switch (SW1) 62 is turned ON in the middle of operation (half stroke) of a shutter button 310, to inform the system controller 50 of the start of the AF processing, the AE processing, the AWB processing, the EF processing and the like. A second shutter switch (SW2) 64 is turned ON upon the completion of the operation (full stroke) of the shutter button 310, to inform the system controller 50 of the start of the series of processings (image sensing) including the processing of reading an image signal from the image sensing device 14 then converting the signal by the A/D converter 16 to digital image data then processing the data by the image processor 20 and writing the processed data via the memory controller 22 into the memory 30, the processing of reading image data from the memory 30 then compressing the data by the compression/decompression circuit 32 and writing the compressed image data into the recording medium 200 or 210.

A zoom operation unit 65 (FIG. 2) is operated by a photographer so as to vary an image sensing view angle (zooming magnification or image sensing magnification). The zoom operation unit 65 may be constituted with a slide type or lever type operation member and a switch or a sensor to detect the operation of the member.

Figure 2:
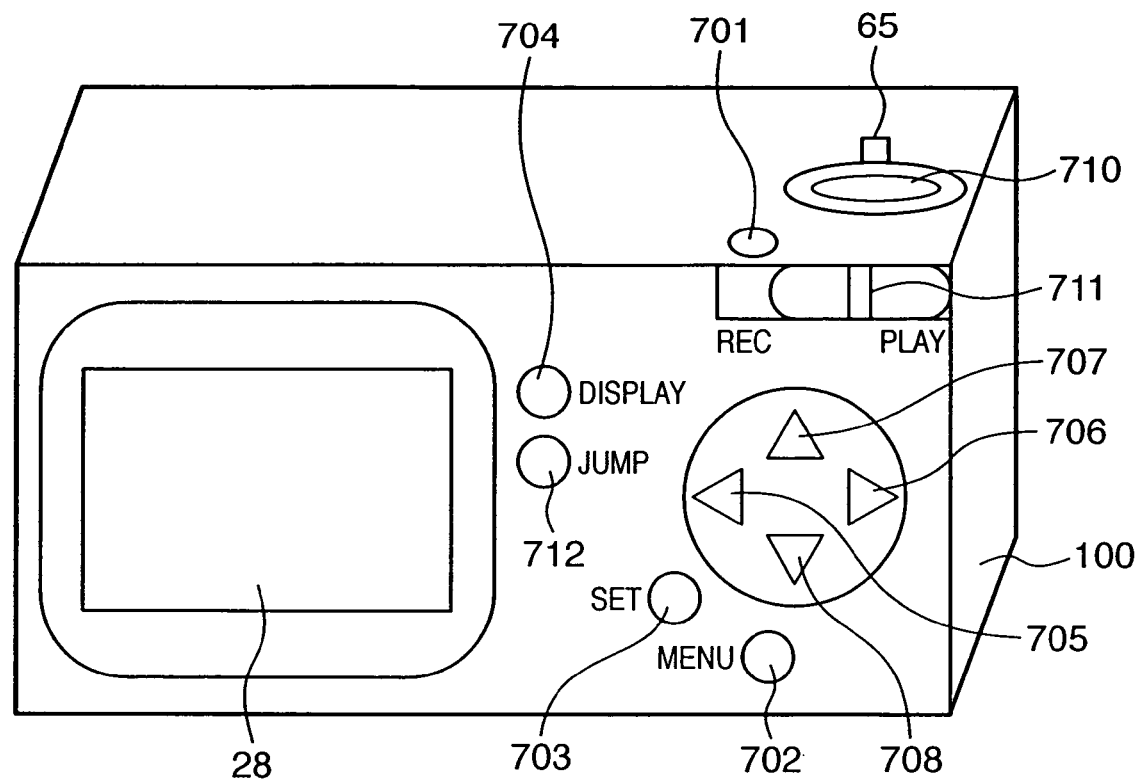
FIG. 2 is a perspective back view of the digital camera according to the embodiment.

An operation unit 70 includes buttons or switches 701 to 712 as shown in FIG. 2. Upon setting or changing of image sensing conditions, upon checking of the image sensing conditions, upon checking of the status of the digital camera 100, upon checking of obtained images, and the like, these buttons or switches 701 to 712 are operated.

A power controller 80, including a power detector, a DC-DC converter, a switch circuit to select an electrified block, and the like, detects presence/absence of power source, the type of power source and remaining battery capacity. The power controller 80 controls the DC-DC converter in accordance with the results of detection and a command from the system controller 50, and supplies a necessary voltage to the respective blocks in necessary periods.

The main body of the digital camera 100 and a power source 86 respectively have connectors 82 and 84 and connected with each other via these connectors. The power source 86 may be a primary battery such as an alkali battery or a lithium battery, or a secondary battery such as an NiCd battery, an NiMH battery or Li battery, or an AC adapter.

The recording media 200 and 210 are connected to connectors 92 and 96 of the main body of the digital camera 100 via connectors 206 and 216. The recording media 200 and 210, including recording units 202 and 212 such as semiconductor memories or hard disks and interfaces 204 and 214, are connected to a bus in the digital camera 100 via interfaces 90 and 94 on the main body side of the digital camera 100. A recording medium attachment/detachment detector 98 detects connection/disconnection between the recording media 200 and 210 and the connectors 92 and 96.

Note that in this example, the digital camera has two systems of interfaces and connectors to which the recording media are connected, however, the number of systems may be one, or three or more. When plural systems of interfaces and connectors are employed, they may have different specification. As the interfaces and connectors, cards compliant with e.g. PCMCIA CF (Compact Flash (registered trademark)) card standards may be employed.

When cards compliant with e.g. PCMCIA CF (Compact Flash (registered trademark)) card standards are employed as the interfaces 90 and 94 and the connectors 92 and 96, image data and management information accompanying the image data can be mutually transferred between the digital camera and a peripheral device such as a computer or a printer by connecting a communication card such as a LAN card, a modem card, a USB card, an IEEE1394 card, a P1284 card, an SCSI card or a PHS.

The optical finer 104 enables image sensing without the electronic finder function by the image display unit 28. In the optical finder 104, display devices constructing a part of the display unit 54 to display focusing, a camera-shake warning, flash charging, a shutter speed, an aperture value, exposure correction and the like, may be arranged.

The digital camera 100 has a communication circuit 110 to provide various communication functions by USB, IEEE 1394, P1284, SCSI, modem, LAN, RS232C, radio communication and the like. The communication circuit 110 is connected to a connector 112 for connection between the digital camera 100 and another device, or connected to an antenna for providing a radio communication function.

In the present embodiment, the communication circuit 110 is a radio LAN (wireless LAN, IEEE802.11x) interface.

FIG. 2 illustrates an example of the outer structure of the digital camera 100. Note that in FIG. 2, constituent elements unnecessary for explanation are omitted.

A power button 701 is employed to start/stop the digital camera 100 or to turn ON/OFF the main power of the digital camera 100. A menu button 702 is employed to display a menu to perform setting of various image sensing conditions or to display the status of the digital camera 100 (the menu includes plural selectable and/or value-variable items). The setting modes or items include an image sensing mode (including, e.g., regarding determination of exposure, a program mode, an aperture-priority mode, and a shutter-speed-priority mode), a panoramic image sensing mode, an information code reading mode, a playback mode, a multi-screen playback/deletion mode, a PC (personal computer) connection mode, exposure correction, flash setting, selection of single shot/continuous shots, self timer setting, recording image quality setting, date and time setting, and protection of recorded image. For example, when the menu button 702 is depressed, the system controller 50 displays the menu on the image display unit 28. The menu may be superimposed on an image being obtained by image sensing, or may be displayed as a single menu image (for example, displayed on a predetermined background color). When the menu button 702 is again depressed while the menu is displayed, the system controller 50 terminates the display of the menu on the image display unit 28.

An enter button 703 is depressed upon determination or selection of mode or item. When the enter button 703 is depressed, the system controller 50 sets a mode or item selected at that time. A display button 704 is employed to select display/nondisplay of image sensing information regarding an obtained image, or to select use/nonuse of the image display unit 28 as an electronic finder.

A left button 705, a right button 706, an up button 707 and a down button 708 (direction selection keys) are employed to change an option (e.g. item or image) selected among plural options by a cursor or as a highlighted portion, to change the position of an index specifying the selected option, or to increase/decrease a numeric value (e.g., a value indicating a correction value or date and time). It is preferable that a user interface is arranged so as to enable selection of two or more items as well as only one item from plural items by the left button 705, the right button 706, the up button 707 and the down button 708. For example, when the left button 705, the right button 706, the up button 707 and the down button 708 are operated while the enter button 703 is depressed, the system controller 50 recognizes that two or more items have been selected by the operation.

A shutter button 710 may be arranged such that a half-stroke status of the button informs the system controller 50 of the start of the AF processing, the AE processing, the AWB processing, the EF processing and the like, and a full-stroke status of the button informs the system controller 50 of the start of image sensing.

A recording/playback selection switch 711 is employed to change a picture recording mode to a playback mode and to change the playback mode to the picture recording mode.

A jump key 712, similar to the direction selection keys, is employed to change an option (e.g. item or image) selected among plural options by a cursor or as a highlighted portion, to change the position of an index specifying the selected option. It may be arranged such that the cursor movement by the jump key is more quickly made or by a larger amount in comparison with that by the direction selection keys.

Note that the above operation system may be replaced with a dial switch or other operation systems.

<Personal Computer>

Figure 3:
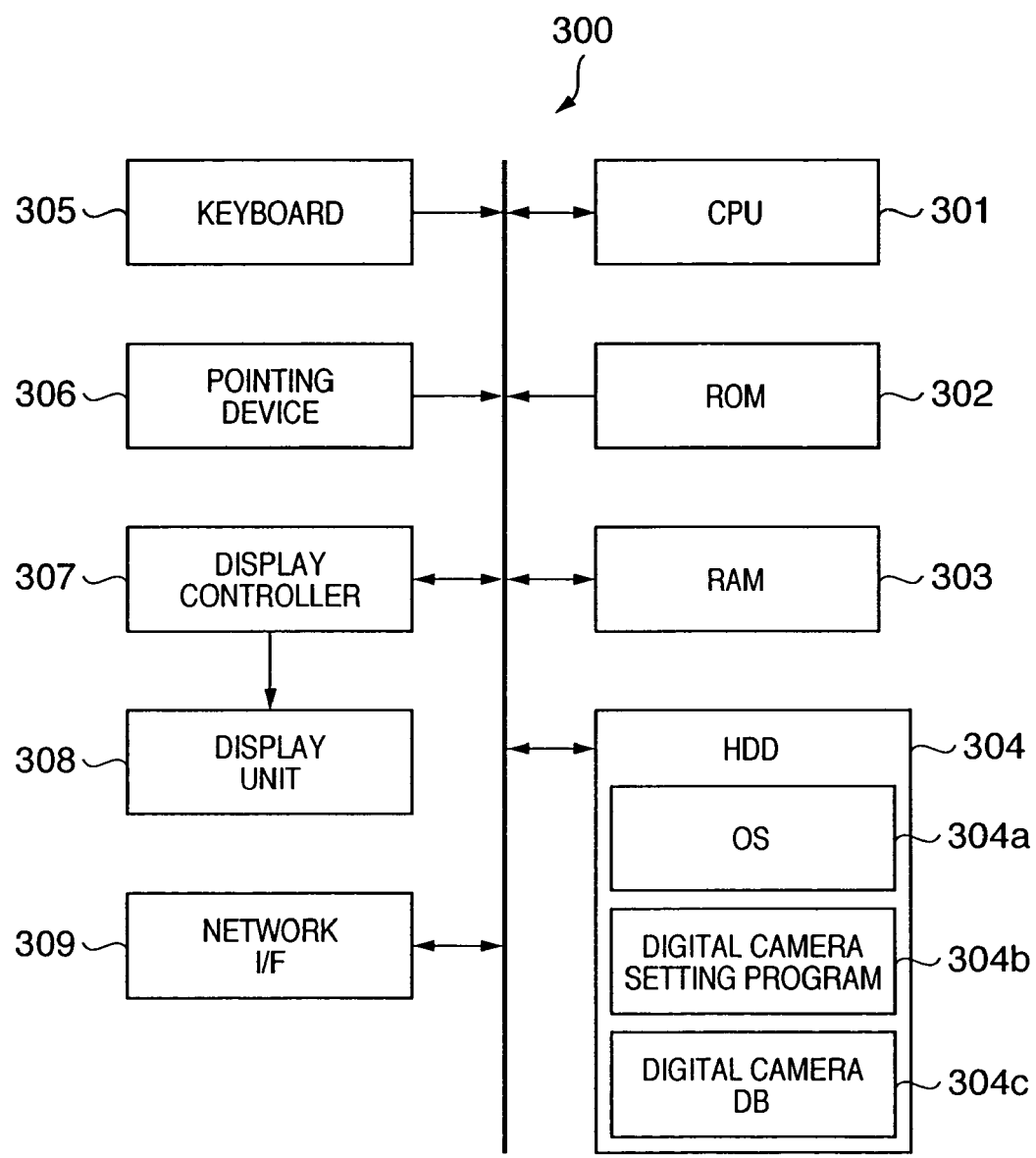
FIG. 3 is a block diagram of a personal computer according to the embodiment.

FIG. 3 is a block diagram of a PC 300 according to the embodiment. In FIG. 3, the PC 300 has a CPU 301 which controls the entire apparatus, a ROM holding a BIOS and a boot program, a RAM used as a work area for the CPU 301, and the following constituent elements.

An OS (Operating System) 304*a*, a digital camera setting program 304*b* according to the embodiment, and a digital camera DB file 304*c* to which the digital camera setting program 304*b* refers, are previously stored in a HDD (hard disk drive) 304. The digital camera DB file 304*c* holds back face images of digital cameras by model and coordinate positions of various switches provided on the back faces (the details will be described later).

A keyboard 305 and a pointing device (e.g., a mouse) 306 are employed to input characters and various commands. A display controller 307 performs drawing processing to an internal video memory and outputs image data stored in the video memory as a video signal to a display unit 308. The display unit 308 is a CRT or a liquid crystal display device. A network interface 309 is employed for connection between the PC 300 and a network. The network interface 309 enables transfer of print data to a printer on the network and access to various servers on the network.

<Settings of Digital Camera>

The digital camera 100 and the PC 300 have constructions as described above. Next, a setting method for connection between a digital camera 300 and a radio LAN will be described below.

The digital camera 300 has a radio LAN communication function to transfer an image obtained by image sensing to a file server on a network or to print-output the image by a printer on the network.

However, even though the digital camera 300 has hardware for connection with a radio LAN, various settings are necessary for communication with the radio LAN. Generally, for connection with an IEEE802.11 radio LAN, various settings, including setting of ESS-ID (Extended Service Set Identifier) as a radio LAN network identifier, setting of Wep Key as an encryption key for leakage prevention, setting of a channel to be used, and setting of an infrastructure mode or ad hoc mode as a communication method, are required. Note that as the encryption technique is a well known technique, the explanation of the encryption will be omitted.

Regarding the ESS-ID and the Wep Key, it is necessary to input respective characters of character strings. Generally, these characters are inputted by repeating selection of a target character by operating the cursor with a cross key from a list of characters displayed on a display panel (liquid crystal display panel) generally provided on the digital camera and operation of an enter key. However, as the operation unit is a simple unit in comparison with a full keyboard of the PC 300, the operation thereof is troublesome, and it is difficult for a user who does not know technical meanings of the above respective parameters.

Accordingly, in the present embodiment, an administrator generates a two-dimensional barcode (QR code) including setting parameters, then a user of a digital camera performs image sensing on the barcode, and the digital camera itself decodes the barcode and sets the parameters. Note that any user of a digital camera having a radio LAN function and a two-dimensional barcode decoding function, who is even a third person unrelated to the above digital camera as the subject of setting, can access the radio LAN, and a security problem occurs. Accordingly, the setting parameters are temporarily encrypted with a secret key and then a two-dimensional barcode is generated using information as the result of encryption. As long as the secret key is shared with only the administrator and the authorized user, the third person who has obtained the two-dimensional barcode in some way cannot decrypt the barcode to the setting parameters.

Figure 6:
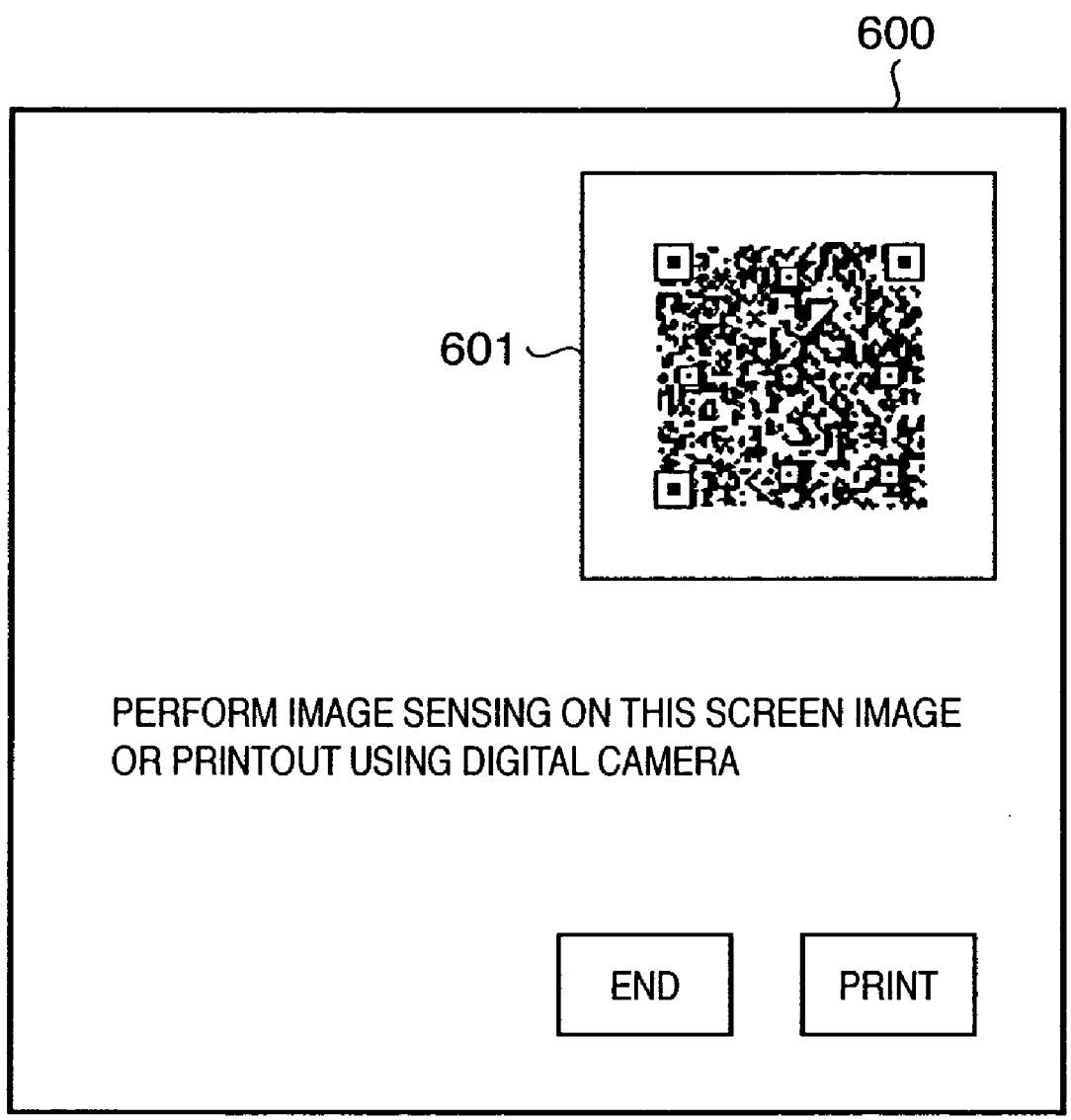
FIG. 6 illustrates another display window displayed on the personal computer according to the embodiment.
Figure 7:
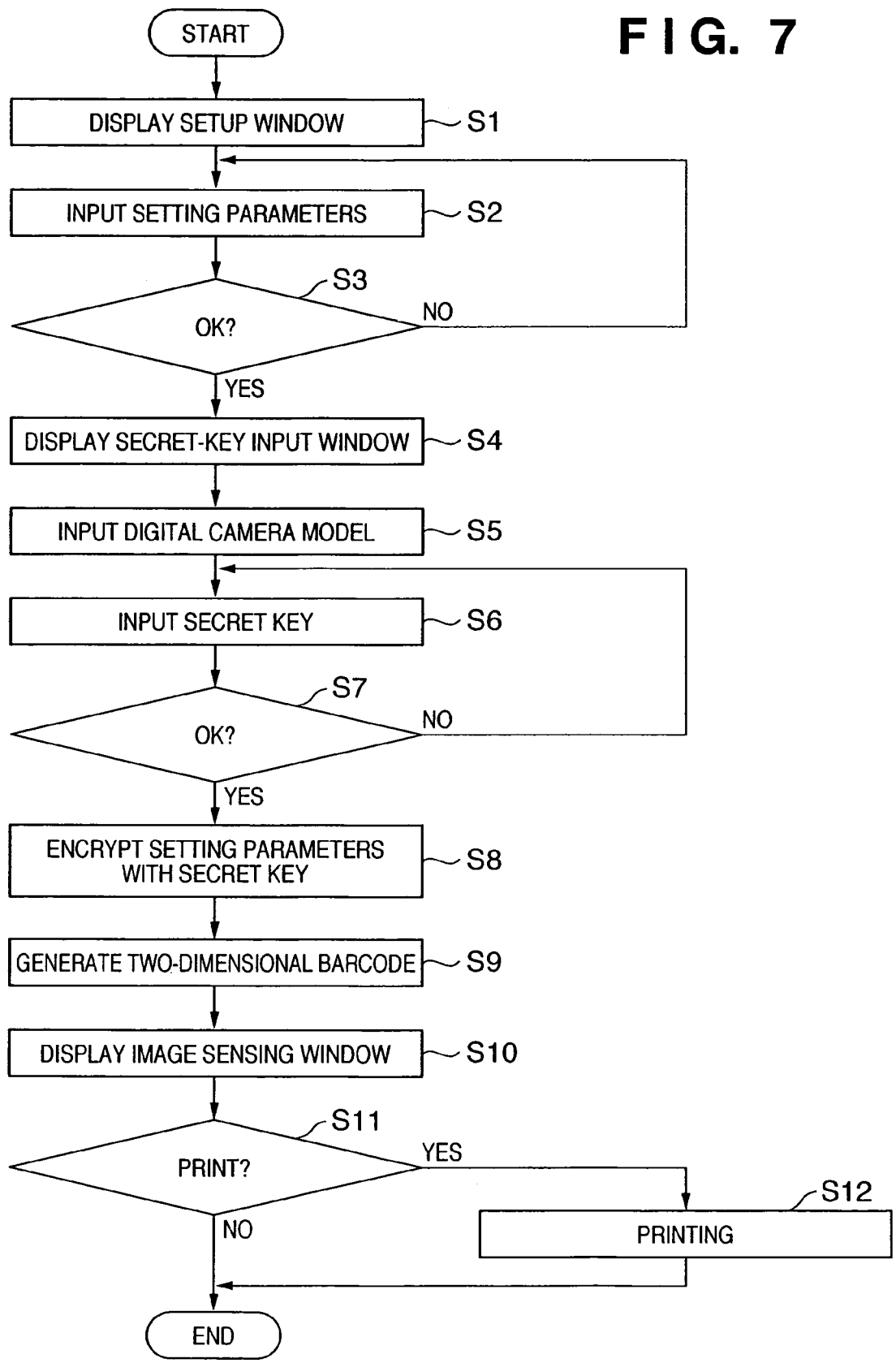
FIG. 7 is a flowchart showing a processing procedure of setting program on the personal computer according to the embodiment.

To realize the above arrangement, first, processing in the PC 300 according to the present embodiment will be described with reference to the flowchart of FIG. 7 and FIGS. 4 to 6. The flowchart of FIG. 7 shows a processing procedure of the digital camera setting program 304b stored in the HDD 304 of the PC 300. Note that in the following description, the OS has been already started.

First, when the administrator instructs the start of this program using the pointing device 306, a setup window 400 as shown in FIG. 4 is displayed at step S1.

As shown in FIG. 4, input fields of respective setting items, ESS-ID, WEP KEY, Channel and Config, are displayed. In the fields of the setting items ESS-ID and WEP KEY, as a character string is to be inputted, a text box is displayed. In the fields of setting items Channel and Config, a combo box for selection from predetermined values is displayed. Regarding the item WEP KEY, a character string as the result of key-input is held inside (RAM 303), and to prevent peeping, asterisks (*) are displayed such that the number of key-inputs can be discriminated but the key types cannot be discriminated.

The administrator sets the respective setting items using the keyboard 305 or the pointing device 306 (step S2).

The completion of the setting of the respective items is indicated by clicking a "Next" button as shown in FIG. 4. When it is determined that the button has been clicked (YES at step S3), the process proceeds to step S4. Note that when a "Cancel" button has been clicked, the process ends.

Figure 5:
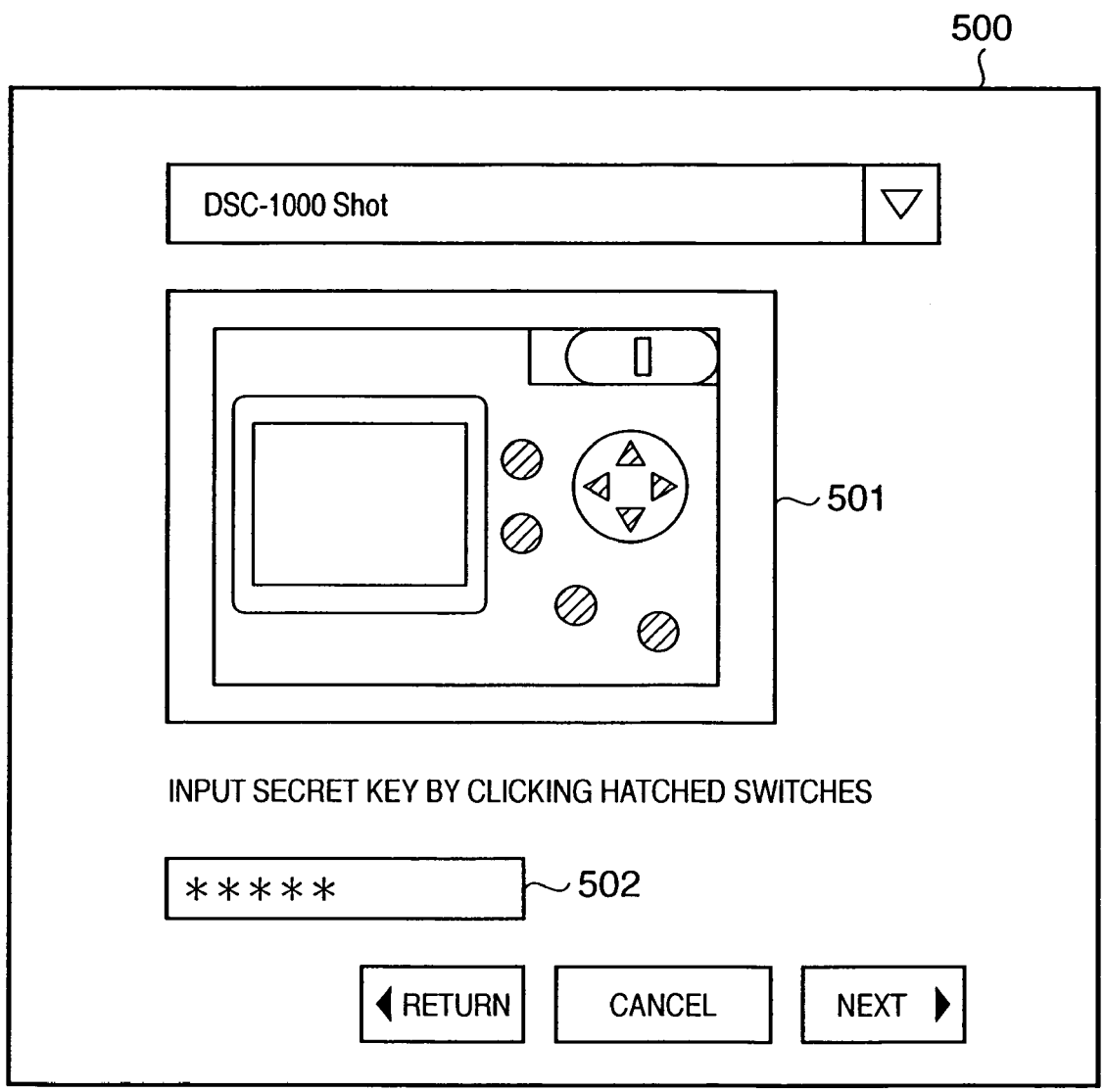
FIG. 5 illustrates another display window displayed on the personal computer according to the embodiment.

When the process proceeds to step S4, a secret key input window 500 as shown in FIG. 5 is displayed in place of the setup window 400. First, the pointing device 306 is operated to input (select) the model of the digital camera as the subject of setting in a combo box 500 (step S5). In FIG. 5, as the model of the digital camera, "DSC-19999 shot" is selected. Note that in this example, the combo box is used, however, the setting may be performed by key-input from the keyboard.

When the selection of the model of the digital camera has been made, a back face image of a corresponding digital camera is retrieved from the digital camera DB 304c stored in the HDD 304, and displayed in an image display area 501. At this time, the coordinate positions of various switches (buttons) on the back face and codes assigned to the switches are read, and predetermined marks are displayed in the respective positions indicated with the coordinate positions on the back face image.

Note that the switches corresponding to the coordinate positions stored in the digital camera DB 304 are switches excluding a shutter button, a power button and a switch holding a slide position. The shutter button is a specialized switch (to be described later), and the slide switch holds its slide position. The power button is also special button. As other switches, which become ON when depressed and become OFF when released, can be similarly handled to keys on a keyboard, they are used for input of a secret key. Note that in a digital camera having a dial, character codes are allocated in its rotational direction.

The administrator inputs a secret key by moving a cursor (not shown) engaged with the pointing device 306 to a desired mark position displayed in the back face image and clicking in the position (step S6). At this time, the administrator may continuously click the same switch, and the order of clicking and the number of inputs are arbitrary. However, predetermined marks (asterisks "*" in the present embodiment) are displayed in correspondence with the number of inputs to the switches.

Thus, when the key-input using the selected digital-camera back face image has been completed, the administrator clicks a "Next" button in a lower part of the window, thereby the input of the secret key (holding a code string inside) is finalized (YES at step S7).

Thereafter, the process proceeds to step S8, at which the respective parameters set in the window in FIG. 4 are converted to data in a predetermined format (e.g., a series of data partitioned with appropriate delimiters), then encrypted with the secret key designated in the window in FIG. 5, thereby encrypted information is obtained. Next, at step S9, two-dimensional barcode image data is generated from the encrypted information. Then at step S10, an image sensing window 600 as shown in FIG. 6 is displayed, and the generated two-dimensional barcode is displayed in an image display area 601. Then image sensing is performed using the digital camera as the subject of setting on this display window. Otherwise, when a "Print" button has been clicked (YES at step S11), the two-dimensional barcode is print-outputted, and the process ends.

Figure 8:
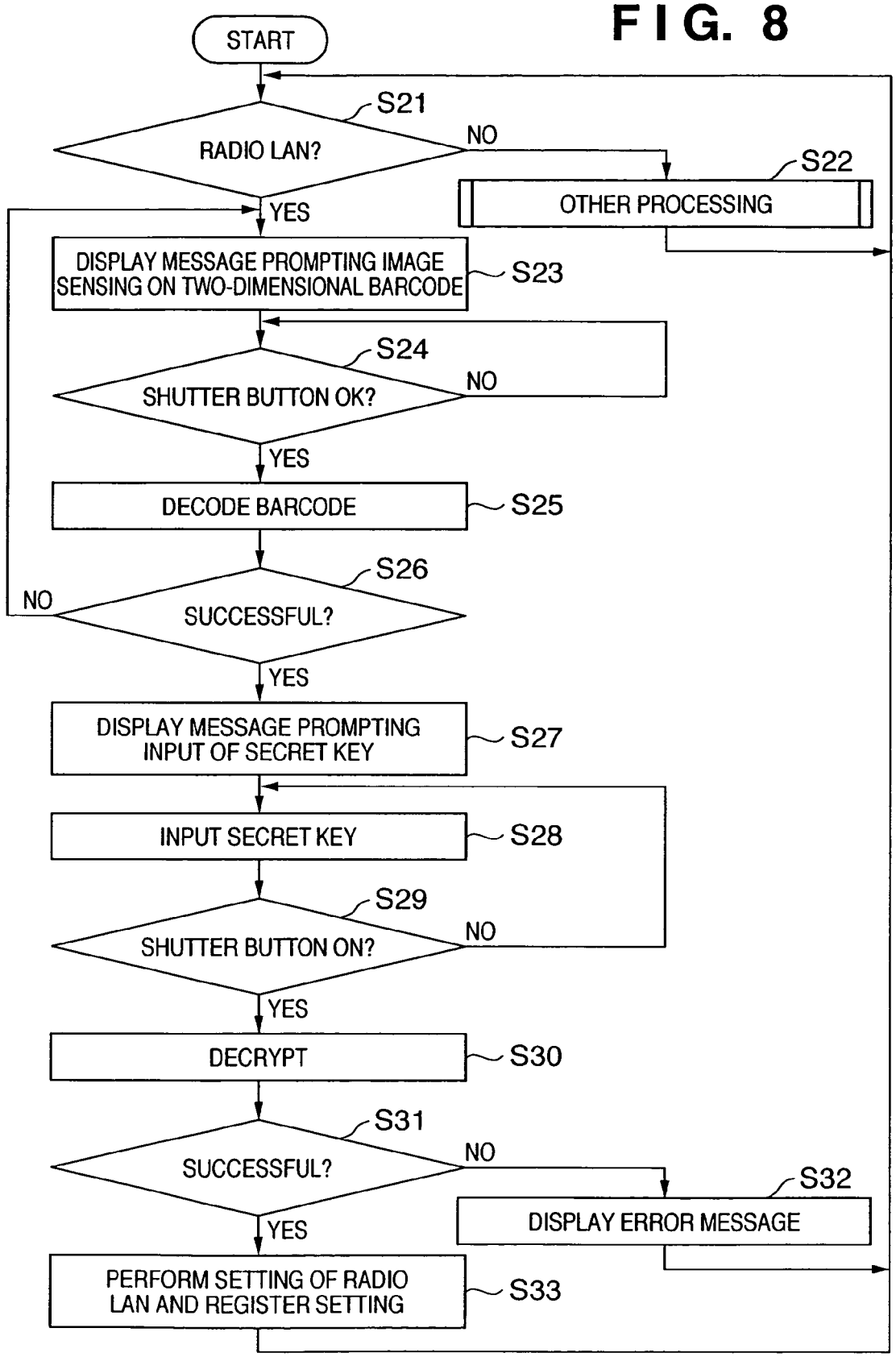
FIG. 8 is a flowchart showing a processing procedure in the digital camera according to the embodiment.

The processing in the PC 300 is as described above. Next, processing in the digital camera 100 according to the present embodiment will be described with reference to the flowchart of FIG. 8. Note that in the following description, the processing is performed by using the display panel of the digital camera 100 and operation of the respective switches.

First, at step S21, it is determined whether or not setting of radio LAN has been designated. The designation of setting of radio LAN is selected from a displayed menu. If it is determined that the designation is not the setting of radio LAN, the process proceeds to step S22 to perform corresponding processing (e.g., normal image sensing).

If it is determined that the setting of radio LAN has been designated, the process proceeds to step S23, at which a message prompting image sensing on a two-dimensional barcode is displayed on the display panel, and at step S24, depression of the shutter button 710 is waited. At this time, image sensing is performed on the PC screen or a printed matter. Note that upon image sensing, the strobe light is turned OFF, and the shutter speed is set to a speed lower than the speed of a vertical synchronizing signal (60 to 80 Hz in a general CRT) so as to prevent the influence of reflected light from the image screen and to obtain an image of the entire display screen. Further, for image sensing of the display screen, the contrast of the display screen is previously increased.

When the shutter button has been depressed, image sensing is performed, then at step S25, the two-dimensional barcode is decoded. Then at step S26, if it is determined that decoding processing has failed due to absence of two-dimensional barcode in the obtained image or the like, step S23 and the subsequent steps are repeated.

If it is determined at step S26 that the decoding of the two-dimensional barcode has been successful, the process proceeds to step S27, at which a message prompting input of a secret key is displayed. Then, the original functions of all the switches available for input of secret key are disabled, and the process proceeds to step S28 to merely determine ON-state of the switches.

At step S28, when a switch has been turned ON, a corresponding code is generated and stored. The input is continued until it is determined at step S29 that the shutter button has been depressed.

If it is determined that the shutter button has been depressed (image sensing is not performed), decryption processing is performed on the information as the result of decoding of the two-dimensional barcode (step S30) in accordance with the inputted and stored code string. It is determined whether or not the decryption has been successful by determining whether or not information obtained by the decryption processing is in a predetermined data format (step S31). If it is determined that the decryption has not been successful, an error display is produced at step S12, and the process ends. If it is determined that the decryption has been successful, setting of the communication circuit 110 related to radio LAN is performed in accordance with the obtained parameters, and the contents of the setting are registered in the nonvolatile memory 56 (When the digital camera is started next time, the radio LAN setting is initialized with the registered contents).

As described above, according to the present embodiment, setting parameters generated on a PC are encrypted, then the result of encryption is converted to a two-dimensional barcode, and the barcode is displayed or print-outputted, thereby the leakage of setting parameters can be prevented. Further, as the operation on the digital camera side is different from a general character input operation, i.e., an input operation can be performed with attention to the order of depression of switches or buttons provided on the operation unit, the setting can be performed with a simple operation, and further, setting of radio LAN can be performed even a user lacks technical knowledge of such setting parameters.

Further, according to the present embodiment, as the input of encryption secret key is performed utilizing an image of an actual digital camera as the subject of setting (in the embodiment, only a back face image is used, however, a perspective image may be employed to use switches provided in an upper part of the camera), there is no trouble in operation of the secret key upon decryption.

Note that in the present embodiment, the setting using a two-dimensional barcode has been described, however, it may be arranged such that a user having adequate technical knowledge of radio LAN can select general character input or image sensing of two-dimensional barcode.

Further, it is preferable that in the relation between a switch position and a code by digital camera model stored in the digital camera DB 304c, the same "code" is not used in plural digital camera models, since in the case of the same maker, the arrays of operation switches on back faces are the same or similar to each other even in different models. That is, it can be arranged such that the decryption does not work in a digital camera other than the selected digital camera.

Further, it may be arranged such that the parameters set in FIG. 4 is stored as a file and it is utilized next time. In this case, the file is read upon generation of a two-dimensional barcode for another model digital camera, and the other model is set and a secret key is inputted. Thus the administrator's work can be simplified.

Further, in the present embodiment, the setting of radio LAN for the digital camera has been described, however, setting is not limited to the radio LAN, further, as the subject device is not limited to the digital camera since any device can be used as well as it has image sensing means or it is connectable to image sensing means. That is, the present invention is applicable to a case where image sensing is performed on information, which must be prevented from leaking, with a corresponding device, and setting is made using the information.

Further, as described in the embodiment, the main processing of the present embodiment is performed in accordance with the program installed in the PC 300, the program is included in the scope of the present invention. Generally, a computer program becomes executable when it is duplicated or installed into a system from a computer-readable recording medium such as a CD-ROM set in a computer. Accordingly, such computer-readable recording medium is also included in the scope of the present invention.

As described above, according to the present invention, parameters for setting in an electronic device can be generated with a simple operation, and further, safely in terms of security.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-304344 filed on Oct. 19, 2004, which is hereby incorporated by reference herein.

What is claimed is:

1. An information processing apparatus for generating a parameter for an electronic device having image sensing means and processing means for performing processing in accordance with said parameter, comprising:
input means for inputting the parameter for said electronic device;
electronic device information storage means which stores images corresponding to operation switches of electronic devices which can be a subject of setting, as well as code information for the operation switches;
selection means of selecting an electronic device which is a subject of setting;
acquisition means which acquires an image and the code information corresponding to the selected electronic device from the electronic device information storage means;
code generating means which displays the image acquired by said acquisition means, and generates codes using the code information corresponding to the operation switches within the displayed image;
encryption means for encrypting the parameter inputted by said input means using the codes generated by said code generation means, thereby generating encrypted information; and
image output means for generating a visible image to be subjected to image sensing by said image sensing means of said electronic device based on the encrypted information obtained by said encryption means, and outputting the visible image;
wherein said electronic-device information storage means further stores position information of the operation switches of the electronic-device;
wherein said acquisition means also acquires the position information from the electronic device information storage means; and
wherein said code generation means determines which switch has been selected from the selection position of the displayed image, and generates a code for encryption from the code information corresponding to the selected operation switch.

2. The information processing apparatus according to claim 1, wherein said image output means generates a two-dimensional barcode from said encrypted information, and outputs the barcode.

3. The information processing apparatus according to claim 2, wherein said image output means enables display output or print-output.

4. The information processing apparatus according to claim 1, wherein said electronic device is an image sensing device having a radio LAN function, and wherein said setting parameter is a radio LAN communication parameter.

5. A control method for an information processing apparatus for generating a parameter for an electronic device having electronic device information storage means which stores images corresponding to operation switches of electronic devices which can be subjects of setting, as well as code information for the operation switches, predetermined image sensing means and processing means for performing processing in accordance with said parameter, comprising:
an input step in which the input means inputs the parameter for said electronic device;
a selection step in which the selection means selects an electronic device which is a subject of setting;
an acquisition step in which the acquisition means acquires an image and code information corresponding to the selected electronic device from the electronic device information storage means;
a code generation step in which the code generation means displays the image acquired by the acquiring means and generating codes using the code information corresponding to the operation switches within the displayed image;
an encryption step in which the encryption means encrypts the parameter inputted at said input step thereby generating encrypted information using the code generated at the code generation step; and
an image output step in which the image output means generates a visible image to be subjected to image sensing by said image sensing means of said electronic device based on the encrypted information obtained at said encryption step, and outputting the visible image
wherein said electronic-device information storage means further stores position information of the operation switches of the electronic-device;
wherein said acquisition step includes acquiring the position information from the electronic device information storage means; and
wherein, in said code generation step, said code generation means determines which switch has been selected from the selection position of the displayed image, and generates a code for encryption from the code information corresponding to the selected operation switch.

6. A computer readable medium encoded with a computer program which, when executed by a computer having electronic device information storage means which stores images corresponding to operation switches of electronic devices which can be subjects of setting as well as code information for the operation switches, functions as an information processing apparatus for generating a parameter for an electronic device having predetermined image sensing means and processing means for performing processing in accordance with said parameter, wherein said program functions as:
input means for inputting the parameter for said electronic device;
electronic device information storage means which stores images corresponding to operation switches of electronic devices which can be a subject of setting, as well as code information for the operation switches;
selection means of selecting an electronic device which is a subject of setting;
acquisition means which acquires an image and the code information corresponding to the selected electronic device from the electronic device information storage means;
code generating means which displays the image acquired by said acquisition means, and generates codes using the code information corresponding to the operation switches within the displayed image;
encryption means for encrypting the parameter inputted by said input means using the codes generated by said code generation means, thereby generating encrypted information; and
image output means for generating a visible image to be subjected to image sensing by said image sensing means of said electronic device based on the encrypted information obtained by said encryption means, and outputting the visible image;

wherein said electronic-device information storage means further stores position information of the operation switches of the electronic-device;

wherein said acquisition means also acquires the position information from the electronic device information storage means; and wherein said code generation means determines which switch has been selected from the selection position of the displayed image, and generates a code for encryption from the code information corresponding to the selected operation switch.

* * * * *